US012699834B2

(12) United States Patent
Wang et al.

(10) Patent No.: US 12,699,834 B2
(45) Date of Patent: Aug. 4, 2026

(54) SYSTEM AND METHOD FOR INTERACTIVE DIALOGUE

(71) Applicant: Samsung Electronics Co., Ltd., Suwon-si (KR)

(72) Inventors: Yu Wang, Bellevue, WA (US); Vijay Srinivasan, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 17/674,258

(22) Filed: Feb. 17, 2022

(65) Prior Publication Data

US 2023/0055991 A1      Feb. 23, 2023

Related U.S. Application Data

(60) Provisional application No. 63/231,006, filed on Aug. 9, 2021.

(51) Int. Cl.
*G06F 40/126* (2020.01)
*G06F 16/334* (2025.01)
(Continued)

(52) U.S. Cl.
CPC ........ *G06F 40/126* (2020.01); *G06F 16/3344* (2019.01); *G06F 40/166* (2020.01); *G06F 40/20* (2020.01); *G06F 40/35* (2020.01)

(58) Field of Classification Search
CPC . G06F 3/00; G06F 3/167; G06F 16/00; G06F 16/3329; G06F 16/3344; G06F 16/9535;
G06F 40/00; G06F 40/20; G06F 40/30; G06F 40/35; G06F 40/126; G06F 40/166; G06N 20/00; G10L 15/00;
(Continued)

(56) References Cited

U.S. PATENT DOCUMENTS 10,783,178 B2     9/2020   Garrett et al.
2016/0259846 A1*  9/2016   Allen ................ G06F 17/30654
(Continued)

FOREIGN PATENT DOCUMENTS

CN          106874441 A  *  6/2017   ......... G06F 16/3329

OTHER PUBLICATIONS

Viros Martin, A. and Selva, D., 2020. Explanation approaches for the Daphne virtual assistant. In AIAA Scitech 2020 forum (p. 225 ), <URL: https://doi.org/10.2514/6.2020-2254> (Year: 2020).*
(Continued)

*Primary Examiner* — Sean E Serraguard

(57) ABSTRACT

A method includes receiving natural-language input from a user. The method also includes receiving, from an information source, one or more candidate recommendations as potential responses to the natural-language input. The method further includes determining, based on a similarity between the natural-language input and a selected candidate recommendation among the one or more candidate recommendations, whether to respond to the natural-language input with natural-language output that includes (i) the selected candidate recommendation or (ii) a query for additional user input. In addition, the method includes providing, based on the determination, the natural-language output to the user.

21 Claims, 9 Drawing Sheets

(51) Int. Cl.
   *G06F 40/166* (2020.01)
   *G06F 40/20* (2020.01)
   *G06F 40/35* (2020.01)
(58) Field of Classification Search
   CPC ..... G10L 15/22; G10L 15/26; G10L 15/1815;
   G10L 2015/223
   See application file for complete search history.

(56) References Cited

U.S. PATENT DOCUMENTS

| | | | |
|---|---|---|---|
| 2018/0232376 A1* | 8/2018 | Zhu | G06F 40/35 |
| 2019/0355361 A1 | 11/2019 | Aggarwal et al. | |
| 2020/0118567 A1 | 4/2020 | Horling et al. | |
| 2020/0311145 A1* | 10/2020 | Li | G06F 16/90332 |
| 2020/0356585 A1 | 11/2020 | Tomkins et al. | |
| 2020/0380980 A1* | 12/2020 | Shum | G10L 15/18 |
| 2021/0082411 A1* | 3/2021 | Yasa | G10L 15/26 |
| 2021/0192397 A1 | 6/2021 | Rastogi et al. | |
| 2021/0200961 A1* | 7/2021 | Shao | G06F 40/284 |
| 2021/0232952 A1 | 7/2021 | Goldstein et al. | |
| 2022/0083882 A1* | 3/2022 | Choi | G06N 5/025 |
| 2022/0124056 A1* | 4/2022 | Cress | G06F 40/284 |
| 2022/0253599 A1* | 8/2022 | Oh | G06F 16/353 |
| 2023/0031461 A1* | 2/2023 | Weissenberger | G10L 13/08 |
| 2023/0147985 A1* | 5/2023 | Totsuka | G06N 3/045 |
| | | | 706/12 |

OTHER PUBLICATIONS

Chen et al., "Towards Explainable Conversational Recommendation", Proceedings of the Twenty-Ninth International Joint Conference on Artificial Intelligence (IJCAI-20), 2020, 7 pgs.

Kang et al., "Recommendation as a Communication Game: Self-Supervised Bot-Play for Goal oriented Dialogue", Proceedings of the 2019 Conference on Empirical Methods in Natural Language Processing and the 9th International Joint Conference on Natural Language Processing (EMNLP-IJCNLP), 2019, 11 pgs.

* cited by examiner

SYSTEM AND METHOD FOR INTERACTIVE DIALOGUE

CROSS-REFERENCE TO RELATED APPLICATION AND PRIORITY CLAIM

This application claims priority under 35 U.S.C. § 119(e) to U.S. Provisional Patent Application No. 63/231,006 filed on Aug. 9, 2021, which is hereby incorporated by reference in its entirety.

TECHNICAL FIELD

This disclosure relates generally to machine learning systems. More specifically, this disclosure relates to a system and method for interactive dialogue.

BACKGROUND

On-device, target-oriented dialogue systems leverage a user's historical data, such as ratings or clicks, to extract the user's preferences and provide search recommendations. However, these types of dialogue systems typically generate static, rather than interactive (such as context-based), search recommendations for a user's specific requests, mood, and preferences and can generate inaccurate results. Also, based on the history of simple user feedback like ratings or clicks, these types of dialogue systems may not be able to determine why users like or dislike an item, which makes it difficult for users to explore a temporary interest or make specific requests.

SUMMARY

This disclosure provides a system and method for interactive dialogue.

In a first embodiment, a method includes receiving natural-language input from a user. The method also includes receiving, from an information source, one or more candidate recommendations as potential responses to the natural-language input. The method further includes determining, based on a similarity between the natural-language input and a selected candidate recommendation among the one or more candidate recommendations, whether to respond to the natural-language input with natural-language output that includes (i) the selected candidate recommendation or (ii) a query for additional user input. In addition, the method includes providing, based on the determination, the natural-language output to the user.

In a second embodiment, an electronic device includes at least one memory configured to store instructions. The electronic device also includes at least one processing device configured when executing the instructions to receive natural-language input from a user. The at least one processing device is also configured when executing the instructions to receive, from an information source, one or more candidate recommendations as potential responses to the natural-language input. The at least one processing device is further configured when executing the instructions to determine, based on a similarity between the natural-language input and a selected candidate recommendation among the one or more candidate recommendations, whether to respond to the natural-language input with natural-language output that includes (i) the selected candidate recommendation or (ii) a query for additional user input. In addition, the at least one processing device is configured when executing the instructions to provide, based on the determination, the natural-language output to the user.

In a third embodiment, a non-transitory machine-readable medium contains instructions that when executed cause at least one processor of an electronic device to receive natural-language input from a user. The medium also contains instructions that when executed cause the at least one processor to receive, from an information source, one or more candidate recommendations as potential responses to the natural-language input. The medium further contains instructions that when executed cause the at least one processor to determine, based on a similarity between the natural-language input and a selected candidate recommendation among the one or more candidate recommendations, whether to respond to the natural-language input with natural-language output that includes (i) the selected candidate recommendation or (ii) a query for additional user input. In addition, the medium contains instructions that when executed cause the at least one processor to provide, based on the determination, the natural-language output to the user.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B"

may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, on-device, target-oriented dialogue systems leverage a user's historical data, such as ratings or clicks, to extract the user's preferences and provide search recommendations. However, these types of dialogue systems typically generate static, rather than interactive (such as context-based), search recommendations to a user's specific requests, mood, and preferences and can generate inaccurate results. These systems are often based on only current round dialogue context and answer for training, and they rely on a model itself to understand a dialogue history instead of a structured model design such that they can learn from a user's dialogue history.

Also, based on the history of simple user feedback like ratings or clicks, these types of dialogue systems may not be able to determine why users like or dislike an item, which makes it difficult for users to explore a temporary interest or make specific requests. For example, if a user who normally reads books from author A asks a dialogue system to search for books from different authors in the same genre, it is likely that the user will still receive recommendations of books from author A in that genre and not receive recommendations of other authors from the dialogue system. If the user does not like the recommendations but is unable to provide accurate feedback through the system, the system is not able to make a correction and generate improved answers. Moreover, the system cannot generate reasonings or justifications as to why the system generates its answers to the user, so the underlying model is not explainable.

This disclosure provides systems and methods for, among other things, multi-reward interactive dialogue using reinforcement learning. As described in more detail below, particular embodiments of the disclosed systems and methods provide a multi-reward framework for performing target-oriented interactive question-answering based on a user's dialogue context. Particular embodiments can also concurrently provide a reasoning summary and justification, such as one that covers all key points that the user addresses during the dialogue. Compared to prior dialogue systems, particular embodiments achieve significant improvements in both target-oriented dialogue and reasoning summarization tasks. Note that while some of the embodiments discussed below are described in the context of a restaurant search dialogue by a consumer mobile device, this is merely one example, and it will be understood that the principles of this disclosure may be implemented in any number of other suitable contexts.

Figure 1:
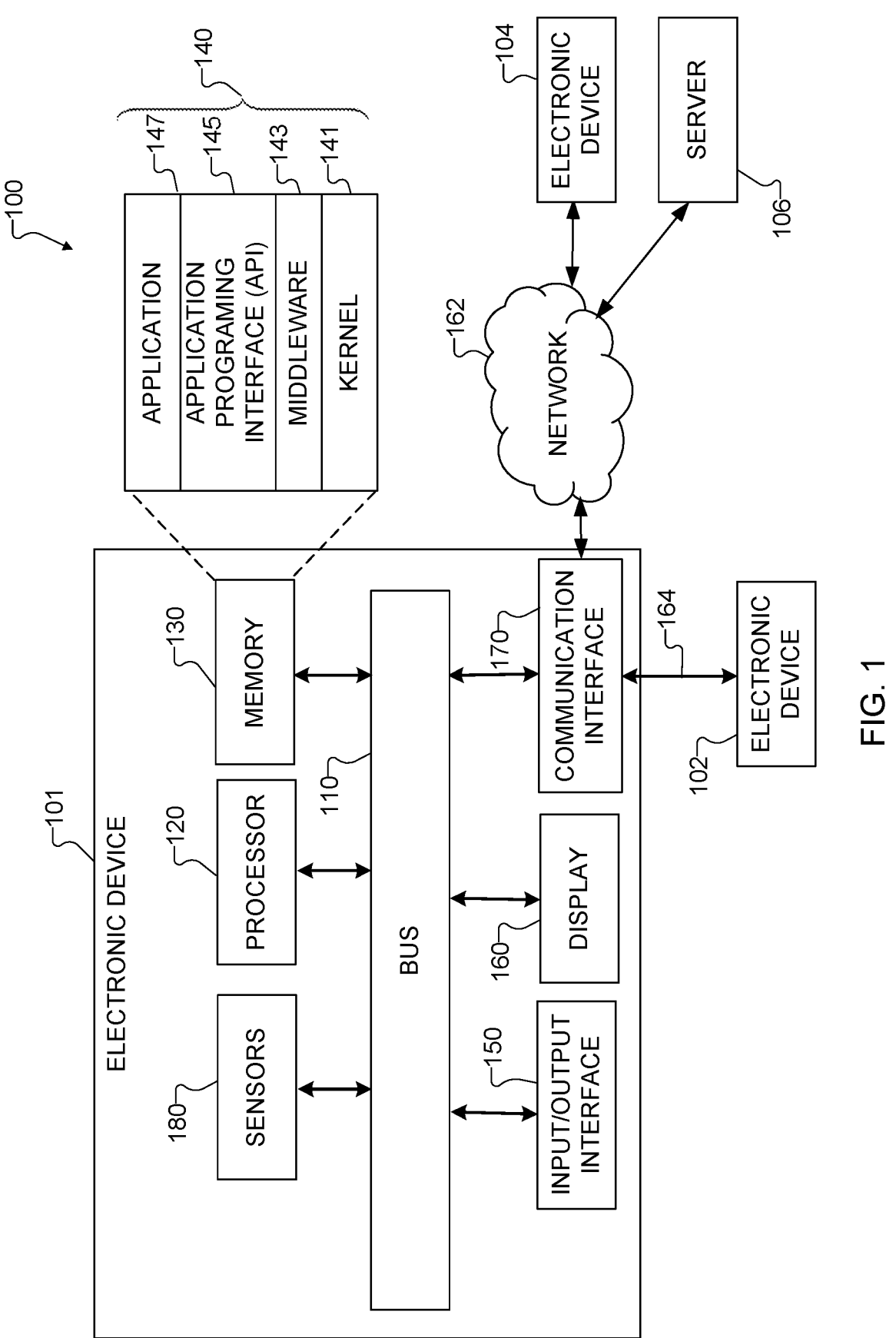
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations supporting interactive dialogue.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions related to interactive dialogue as discussed below. These functions can be performed by a single application or by multiple applications that each carry out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for interactive dialogue.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
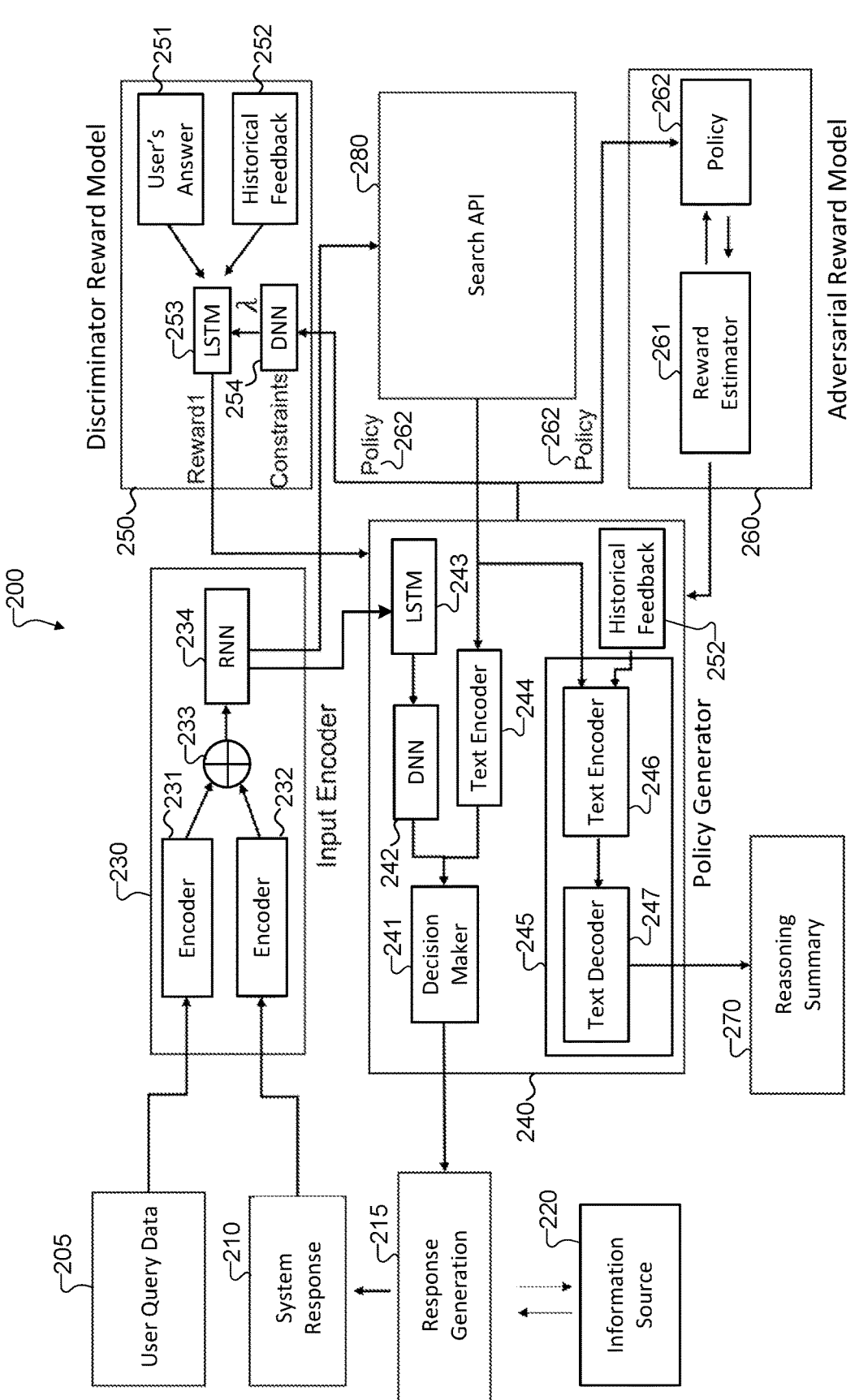
FIG. 2 illustrates an example dialogue system in which multi-reward interactive dialogue using reinforcement learning can be implemented according to this disclosure.

FIG. 2 illustrates an example dialogue system 200 in which multi-reward interactive dialogue using reinforcement learning, among other features, can be implemented according to this disclosure. For ease of explanation, the system 200 is described as being implemented using one or more components of the electronic device 101 described above. However, this is merely one example, and the system 200 could be implemented using any other suitable device(s), such as when implemented using the server 106.

As shown in FIG. 2, using the dialogue system 200, the electronic device 101 can receive user query data 205, which can include one or more natural-language inputs generated by a user, such as queries, user answers 251 (such as answers to system queries), and user historical feedback 252. The user query data 205 can represent data received or generated in any suitable manner. In some embodiments, at least some of the user query data 205 can be spoken by the user and received by the electronic device 101 as audio input and/or input by the user as a text input on a user interface of the electronic device 101.

The electronic device 101 can also obtain one or more system responses 210. Each system response 210 represents a system-generated response to one or more of the user query data 205. Depending on the user query data 205 and the available information, each system response 210 may be an answer to the user query data 205 or a request for additional information (such as a follow-up question) related to the user query data 205. To obtain the system responses 210, the electronic device 101 can perform a response generation routine 215 in which the electronic device 101 generates answers or follow-up questions including the system responses 210. In the response generation routine 215, the electronic device 101 receives response-related information from an information source 220. The information source 220 represents any suitable data repository or other information source from which information related to the user query data 205 can be obtained by the electronic device 101. In some embodiments, the information source 220 is a third-party information source maintained by a third-party entity, such as an online review site (like YELP). In the response generation routine 215, the electronic device 101 also receives decision information from a policy generator 240. The decision information from the policy generator 240 enables the electronic device 101 to decide whether to form each system response 210 as an answer or as a follow-up question.

Figure 3:
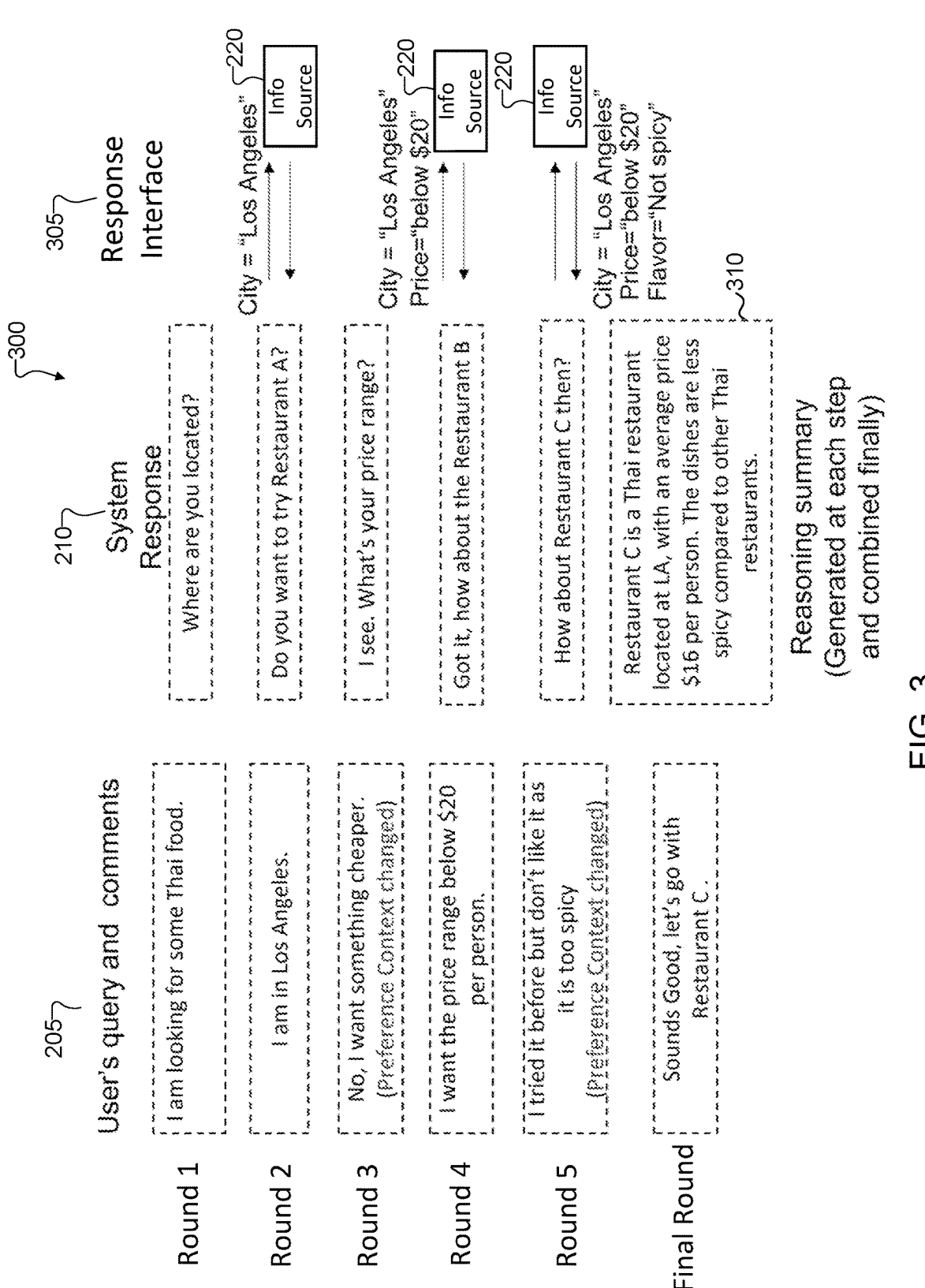
FIG. 3 illustrates an example dialogue flow using the dialogue system of FIG. 2 according to this disclosure.

FIG. 3 illustrates an example dialogue flow 300 using the dialogue system 200 according to this disclosure. For ease of explanation, the dialogue flow 300 is described as a restaurant recommendation dialogue that is implemented using a mobile device, which may be represented by the electronic device 101. However, this is merely one example, and the dialogue flow 300 could include other types of dialogue and could be implemented using any other suitable device(s), such as when implemented using the server 106.

As shown in FIG. 3, the dialogue flow 300 can be performed in multiple rounds. The dialogue flow 300 involves the user query data 205 and the system responses 210, where the user query data 205 includes multiple queries or comments by the user and where each system response 210 is responsive to one of the user query data 205. The dialogue flow 300 also involves the information source 220. As indicated above, the information source 220 can be, for example, an online review site. In the example shown in FIG. 3, the information source 220 includes YELP's database of restaurants and reviews. The electronic device 101 can exchange information with the information source 220 via a response interface 305. The response interface 305 represents any suitable communication interface for transmitting information to the information source 220 and receiving information from the information source 220. In some embodiments, the response interface 305 can include an API, such as a YELP API.

In Round 1, first user query data 205 is generated. For example, the user can ask a question to the electronic device 101 (such as to recommend a Thai restaurant). Using the response generation routine 215, the electronic device 101 determines that the pool of candidate recommendations (such as all known Thai restaurants) is too large to make a restaurant recommendation. Thus, the electronic device 101 generates a first system response 210 in the form of a follow-up question, such as "Where are you located?"

In Round 2, second user query data 205 is generated. For example, the user can respond to the first system response 210 with an answer or comment, such as "I am in Los Angeles." Using the response generation routine 215, the electronic device 101 exchanges information with the information source 220 to obtain restaurant information based on the user query data 205. For example, the electronic device 101 can generate an API request to the information source 220 and obtain information about Thai restaurants in Los Angeles based on the user query data 205.

After obtaining the restaurant information, the electronic device 101 uses decision information from the policy generator 240 to decide whether or not to use the obtained restaurant information. The decision can be made based on a correlation between the user query data 205 and the information obtained from the information source 220. For example, if the correlation is below the predetermined threshold, the electronic device 101 may make a decision to ask another question. Conversely, if the correlation is above a predetermined threshold, the electronic device 101 may make a decision to make a recommendation. As shown in FIG. 3, in Round 2, the electronic device 101 decides to recommend Thai restaurant A, generates a corresponding system response 210 (such as "Do you want to try Restaurant A?"), and waits for a response from the user.

In Round 3, third user query data 205 is generated. For example, the user can respond to the second system response 210 with an answer or comment, such as "No, I want something cheaper." This user query data 205 represents a change in preference context because the user has added a new preference context, such as price. Based on the changed preference context, the electronic device 101 generates a third system response 210 in the form of a follow-up question, such as "I see. What's your price range?"

In the Round 4, fourth user query data 205 is generated. For example, the user can respond to the third system response 210 with an answer or comment, such as "I want the price range below $20 per person." Using the response generation routine 215, the electronic device 101 exchanges information with the information source 220 to obtain restaurant information based on the user query data 205. In this round, the electronic device 101 provides multiple data (City="Los Angeles," Price="below $20") as input to the information source 220 in order to enable the information source 220 to filter the results. Here, the electronic device 101 can obtain from the information source 220 information about Thai restaurants in Los Angeles that are below $20 per person.

After obtaining the restaurant information, the electronic device 101 uses decision information from the policy generator 240 to decide whether or not to use the obtained restaurant information. As shown in FIG. 3, in Round 4, the electronic device 101 decides to recommend Thai restaurant B, generates a corresponding fourth system response 210 (such as "Got it, how about the Restaurant B?"), and waits for a response from the user.

In Round 5, fifth user query data 205 is generated. For example, the user can respond to the fourth system response 210 with an answer or comment, such as "I tried it before but don't like it as it is too spicy." This user query data 205 represents another change in preference context because the user has added another new preference context, such as flavor. Using the response generation routine 215, the electronic device 101 exchanges information with the information source 220 to obtain restaurant information based on the user query data 205. In this round, the electronic device 101 provides multiple data (City="Los Angeles," Price="below $20," Flavor="not spicy") as input to the information source 220 in order to enable the information source 220 to filter the results. Here, the electronic device 101 can obtain from the information source 220 information about Thai restaurants in Los Angeles that are below $20 per person and are not spicy.

After obtaining the restaurant information, the electronic device 101 uses decision information from the policy generator 240 to decide whether or not to use the obtained restaurant information. As shown in FIG. 3, in Round 5, the electronic device 101 decides to recommend Thai restaurant C, generates a corresponding fifth system response 210 (such as "How about Restaurant B then?"), and waits for a response from the user.

In the final round, sixth user query data 205 is generated. For example, the user can respond to the fifth system response 210 with an answer or comment, such as "Sounds good, let's go with Restaurant C." This user query data 205 represents an acceptance of the system recommendation. Using the response generation routine 215, the electronic device 101 generates a final system response 210 that includes a reasoning summary 310. As shown in FIG. 3, the final system response 210 is "Restaurant C is a Thai restaurant located at LA, with an average price $16 per person. The dishes are less spicy compared to other Thai restaurants." The reasoning summary 310 includes the different parts of the final system response 210 ("Thai restaurant," "located at LA," "average price $16 per person," "less spicy compared to other Thai restaurants") that explain the reason(s) that Restaurant C is recommended.

Turning again to FIG. 2, the dialogue system 200 also includes an input encoder 230 that is used to encode the user query data 205, the system responses 210, or both into slots. In some embodiments, the input encoder 230 can include multiple encoders 231 and 232, a summation routine 233, and a recurrent neural network (RNN) 234. The encoder 231 receives and encodes the user query data 205, which can include the user's answers 251 and the historical feedback 252. The encoder 232 receives and encodes the system responses 210. Each encoder 231 and 232 represents any suitable algorithm, process, or routine for encoding data. In some embodiments, each of the encoders 231 and 232 includes a pre-trained Bidirectional Encoder Representations from Transformers (BERT) encoder model. The encoded results are combined in the summation routine 233 and input to the RNN 234, which operates as a slot tagger to extract slots that are provided as inputs to a search API 280. The search API 280 is used to share information with the information source 220. The search API 280 can represent (or be represented by) the response interface 305 of FIG. 3.

The extracted slots from the input encoder 230 are also provided as inputs to the policy generator 240. The electronic device 101 uses decision information from the policy generator 240 to decide whether to form each system response 210 as an answer or a follow-up question. As described in greater detail below, the policy generator 240 can leverage multiple rewards for different aims at the same time and generate a combined policy 262 for both recommendation and summary generation tasks. In this example, the policy generator 240 contains two interconnected subnetworks, namely a decision maker 241 and a reasoning summary generator 245. The decision maker 241 determines and provides the policy 262 for generating the system responses 210 (such as recommendations or follow-up questions) during dialogue. The reasoning summary generator 245 generates a reasoning summary 270 in the final round of dialogue by summarizing the user's preferences, one or more justifications/reasoning, and the final recommendation. Here, the reasoning summary 270 can represent (or be represented by) the reasoning summary 310 of FIG. 3. As shown in FIG. 2, the policy generator 240 also includes a deep neural network (DNN) 242, a long short term memory (LSTM) network 243, multiple text encoders 244 and 246, a text decoder 247. The text encoder 246 and the text decoder 247 form portions of the reasoning summary generator 245 as described in greater detail below.

Figure 4:
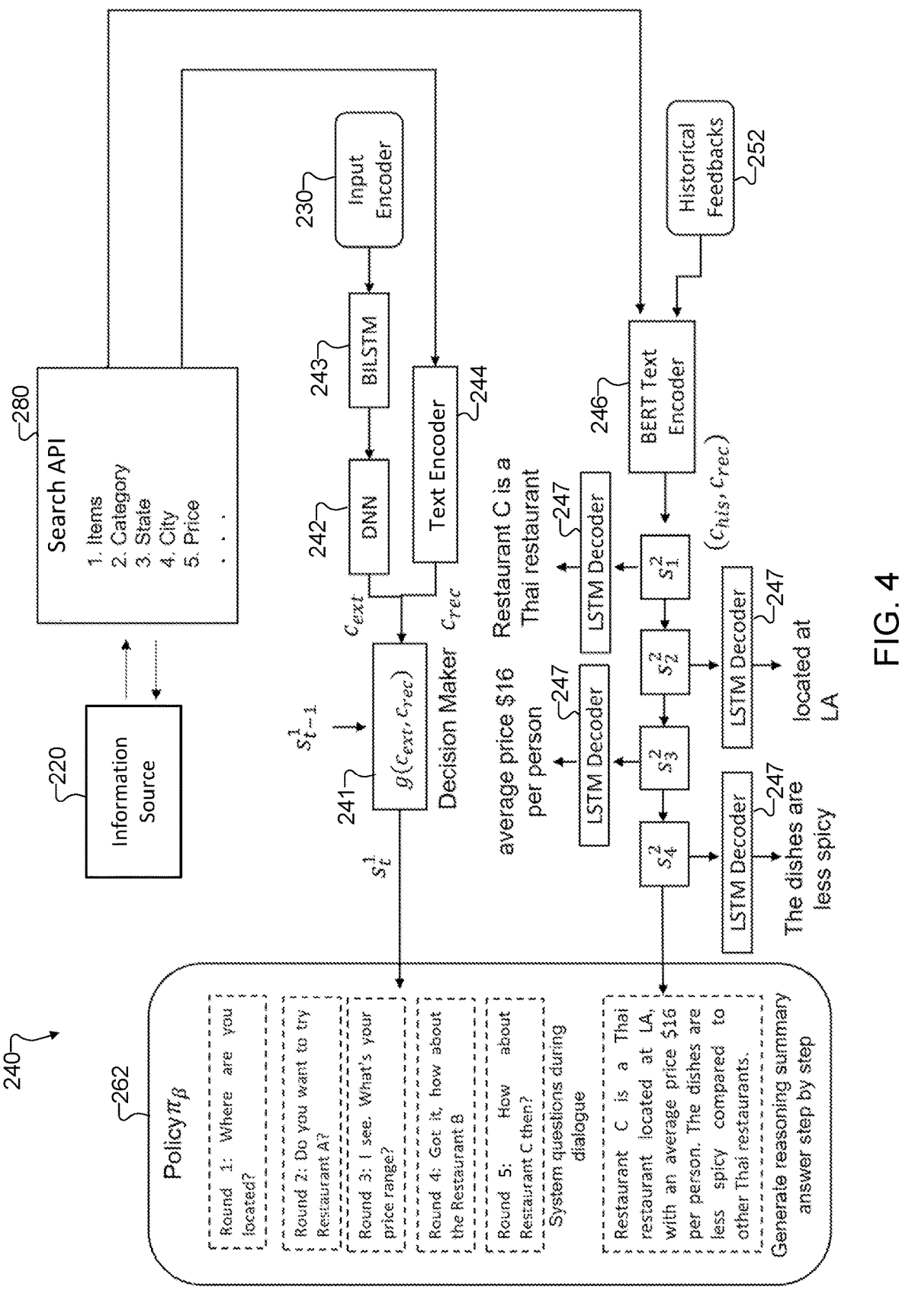
FIG. 4 illustrates example details of a policy generator of FIG. 2 according to this disclosure.

FIG. 4 illustrates example details of the policy generator 240 according to this disclosure. As shown in FIG. 4, the policy generator 240 receives the extracted slots from the input encoder 230 as inputs and encodes a feature vector using the LSTM network 243 followed by the DNN 242. The output here is a feature vector $c_{ext}$, which is provided as an input to the decision maker 241.

The policy generator 240 also requests and receives information from the information source 220 via the search API 280. The information received from the information source 220 is related to the user query data 205. For example, the policy generator 240 may request that the information source 220 return information in response to a user's request for restaurant information. The information received from the information source 220 can be categorized into one or more slots (such as categories of information) for each of a number of candidate recommendations (such as for each restaurant) from the information source 220. In the restaurant search example described in FIG. 3, the slots may include categories such as food items, state, city, price, flavor, and the like. Thus, for each restaurant identified by the information source 220, the information can include the restaurant name along with corresponding information for a price slot, a food-type slot, a location slot, a flavor slot, and the like. The policy generator 240 selects one of the candidate restaurants received from the information source 220 as a selected candidate recommendation, and the text encoder 244 encodes the corresponding slot information as a recommendation feature vector $c_{rec}$. The recommendation vector $c_{rec}$ is an N-dimensional vector, where N is the number of slots returned by the information source 220 and where each dimension of the vector corresponds to one of the slots. In some embodiments, the information source 220 can return a ranked list of candidate recommendations, in which case the top-ranked candidate and corresponding slot information may be used for the selected candidate recommendation. The recommendation vector $c_{rec}$ is also provided as an input to the decision maker 241.

The decision maker 241 represents an algorithm, process, or routine performed by the electronic device 101 to decide whether or not to use recommendations from the information source 220, such as based on the correlation between the encoded input from the input encoder 230 and the information from the information source 220. In some embodiments, the decision maker 241 includes a dense layer, such as an LSTM neural network. More specifically, the electronic device 101 implements the decision maker 241 to decide whether to generate answers or ask follow-up questions depending on the correlation. In some embodiments, the decision maker 241 outputs a scalar value representing the correlation between two vectors. If the correlation between the two vectors is above a predetermined threshold, the electronic device 101 can decide to provide a recommendation as a system response 210. If the correlation between the two vectors is below the predetermined threshold, the electronic device 101 can decide to ask a follow-up question as the system response 210.

The decision maker 241 receives the feature vectors $c_{ext}$ and $c_{rec}$ as inputs and performs a function $g_{dec}$ ($c_{ext}$, $c_{rec}$), which generates a real-valued N-dimensional similarity vector $c_{sim}$. Each real-value number in the similarity vector $c_{sim}$ may represent a probability of the corresponding slot information for the selected candidate recommendation satisfying the user request represented in the user query data 205. For example, a three-slot recommendation vector $c_{rec}$ in the form of [type, price, location] may result in a similarity vector $c_{sim}$ of [0.25, 0.45, 0.33].

The decision maker 241 compares each value of the similarity vector $c_{sim}$ to the predetermined threshold. For example, the threshold may be 0.5. If at least one value exceeds the threshold, the decision maker 241 may output the selected candidate recommendation to the user as the system response 210. If none of the values exceeds the threshold, a request for more detailed information (such as a follow-up question) may be output to the user as the system response 210. The request for more information may correspond to one or more of the information slots provided by the information source 220. For example, if a price slot exists among the information received from the information source, the decision maker 241 may generate a system response 210 of "What price range do you want?" In some embodiments, the follow-up question is related to a slot used by the information source 220 that is missing information (such as "Where are you located?" if the "location" slot is missing information). In the next round, if the user query data 205 includes a user response providing a price range, the next candidate recommendation(s) supplied by the information source 220 can meet the user's price range request. As a result, the real-value number in the similarity vector $c_{sim}$ in the next round should be higher than in the previous round, as the user input vector $c_{ext}$ and the recommendation vector $c_{rec}$ are more similar.

When a dialogue with the user includes multiple rounds, such as in the dialogue flow 300, the user query data 205 for all rounds (which includes the user's current and previous input for the dialogue) may be included in the user input vector $c_{ext}$. In some embodiments, more weight may be given to more recent inputs by the user (such as the user query data 205 in more recent rounds). For example, the inputs may be encoded in order of recency, and the decision maker 241 may give more attention to the first values of the encoded vector. As a particular example, if a sequence of user inputs is "I am looking for some Thai food," "My price range is less than $20," and "I am in Los Angeles," the location information may be given the greatest importance in calculating the N-dimensional recommendation vector $c_{rec}$ since "I am in Los Angeles" is the most recent user input. Formulated into a reinforcement learning structure, the state for tracking the decision maker 241 in some embodiments may be defined as follows:

$$s_t^1 = f_{lstm}\big(g_{dec}(c_{ext}, c_{rec}), s_{t-1}^1\big) \tag{1}$$

where $$s_t^1$$

is the current state of the decision maker 241 containing the recommendation information for the current round t, and $$s_{t-1}^1$$

is the previous state containing the previous round's recommendation information (such as the state for Round 2 if the current round is Round 3).

As discussed above, the reasoning summary generator 245 includes the text encoder 246 and the text decoder 247. In some embodiments, the text encoder 246 may be based on a BERT model structure, and the text decoder 247 may be an LSTM network. Of course, these are merely examples, and other types of encoders and decoders are possible and within the scope of this disclosure. The text encoder 246 receives as input a concatenation of the candidate recommendation(s) supplied by the information source 220 and the user's historical feedback 252. The output of the text decoder 247 is the natural language text generated for the reasoning summary 270. Formulated into a reinforcement learning structure, the state for tracking the reasoning summary 270 in some embodiments may be defined as follows:

$$s_t^2 = f_{lstm}\big(g_{bert}(c_{his}, c_{rec}), s_{t-1}^2\big) \tag{2}$$

where $$s_t^2$$

is the current state of the reasoning summary generator 245 for the current round t, $$s_{t-1}^2$$

is the previous state for the previous round, and $c_{his}$ is an encoded vector representing the user's historical feedback 252.

During each round of the dialogue flow 300 of FIG. 3, the reasoning summary generator 245 also generates the summary text step-by-step, such as to include all of the details of the reasoning summary 270. For example, state $$s_1^2$$

is generated in Round 1, state $$s_2^2$$

is generated in Round 2, state $$s_3^2$$

is generated in Round 3, and state $$s_4^2$$

is generated in Round 4. If there are additional rounds, additional states $$s_t^2$$

are generated during those rounds. Conversely, if there are less than four rounds, at least $$s_4^2$$

would not be generated. The summary text generated in each round may later be combined to form the reasoning summary 270.

In some embodiments, the combined policy 262 generated by the policy generator 240 can be defined as follows:

$$\pi_\beta = f_{softmax}(W s_t + b) \tag{3}$$

where $\pi_\beta$ represents the policy 262, W is a weighting matrix, $$s_t = \left[ s_t^1, s_t^2 \right]$$

is the concatenation of the two states generated separately by the decision maker 241 and the reasoning summary generator 245, and b is a Bayer vector that provides initialization values for the function. In some embodiments, the vector b is a zero vector.

Turning again to FIG. 2, the dialogue system 200 is a multi-reward system that includes multiple reward sub-models, such as a discriminator reward model 250 and an adversarial reward model 260. The discriminator reward model 250 leverages the user's preference changes in the user query data 205 as constraints during the interactive dialogue. Hence, a reward $$R_\theta^1$$

generated in the discriminator reward model 250 cam be used to find the optimal recommendations or questions to the user at each round of dialogue. Comparatively, the adversarial reward model 260 associates the generation of the reasoning summary 270 with a different reward $$R_\psi^2.$$

As discussed above, the reasoning summary 270 also contains the user's preferences identified during the dialogue. The collaboration of the discriminator reward model 250 and the adversarial reward model 260 covers both the user's preference changes during the dialogue and how to generate a portion of the reasoning summary 270 at each round of dialogue.

Figure 5:
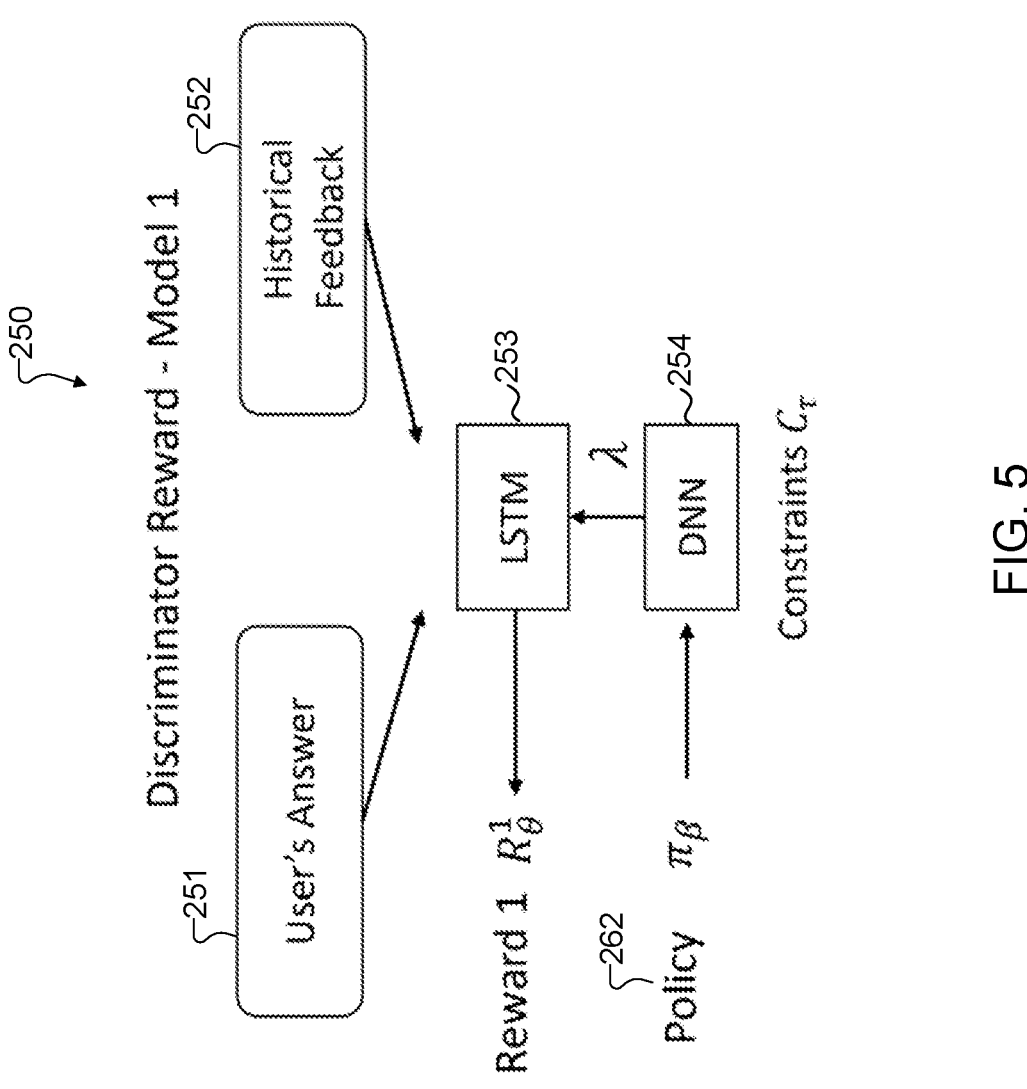
FIG. 5 illustrates example details of a discriminator reward model of FIG. 2 according to this disclosure.

FIG. 5 illustrates example details of the discriminator reward model 250 according to this disclosure. As shown in FIG. 5, the discriminator reward model 250 is provided to discriminate whether or not a recommendation or a question during round t violates previous feedback from the user in the current dialogue session. That is, given the system response and the historical user preference features, the discriminator reward model 250 determines whether the system response 210 (such as a recommendation or question) violates the user's feedback. In some embodiments, the discriminator reward model 250 includes an RNN model 253 that can be trained dynamically in real-time to incrementally learn the matching between the user feedback and system responses. The RNN model 253 generates the corresponding reward $$R_\theta^1$$

as its output by taking the policy 262 generated by the policy generator 240 as its input. The discriminator reward model 250 also takes the user's preferences and chat history as the constraints $C_\tau$ for the policy 262. In some cases, the constraint function may be modeled by a dense DNN network 254.

Figure 6:
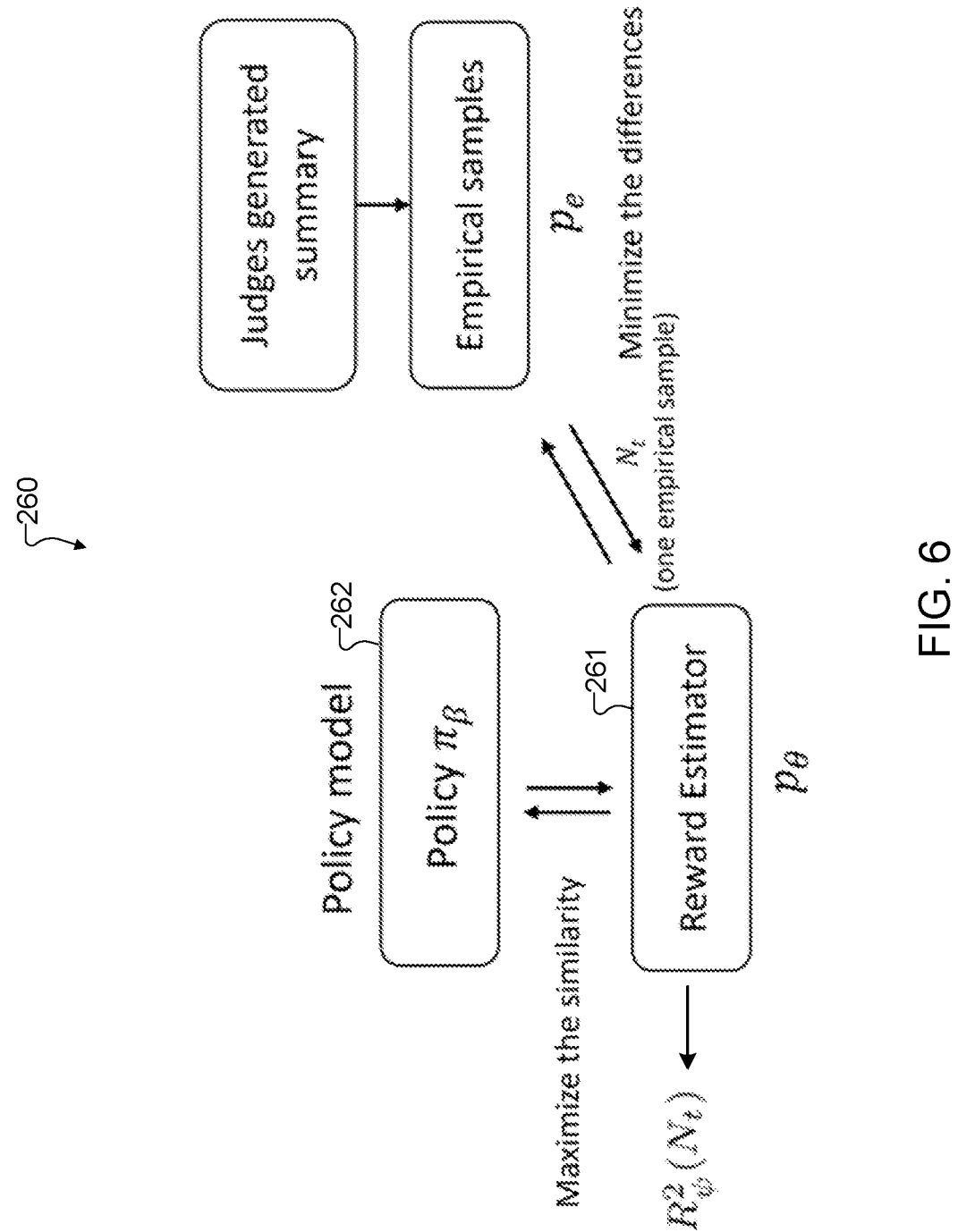
FIG. 6 illustrates example details of an adversarial reward model of FIG. 2 according to this disclosure.

FIG. 6 illustrates example details of the adversarial reward model 260 according to this disclosure. In order to associate the reward with the reasoning summary 270 (such as the final round generated natural language based recommendation text), the reward $$R_\psi^2.$$

is designed to include the natural language recommendation as the system final output. It is noted that the output $N_t$ is a natural language recommendation given by the system 200 in the final round by covering all the details in the dialogue. During training, a ground truth summary text may be provided, and the adversarial reward model 260 tries to learn the ground truth summary text and generate similar natural language patterns based on the user's feedback history through an adversarial learning network.

As shown in FIG. 6, the adversarial reward model 260 includes a reward estimator 261. In some embodiments, the reward estimator 261 has a convolutional neural network (CNN)-based structure. The reward estimator 261 queries the word embeddings of the final round recommendation text, and multiple convolutional layers with different kernel sizes are used to extract n-gram features that are projected into a sentence-level representation space by pooling layers. In addition to the textual features, evaluation of the quality of a recommendation text can also consider the user's preference features for relevance. Therefore, the reward estimator 261 combines the sentence representation with the user's historical preference features through concatenation and feeds them into a final fully-connected decision layer. In the end, the reward estimator 261 outputs the estimated reward value $$R_\psi^2.$$

In some embodiments, this process can be expressed as follows:

$$R_\psi^2(N_t) = \phi(W_r f_{cnn}(N_t) + W_i I_{pre} + b_r) \tag{4}$$

where $N_t$ is the summary text provided in the last round, $\phi$ denotes the non-linear projection function, $W_r$ and $b_r$ denote the weight and bias in the output layer, $f_{cnn}$ denotes the operations in the CNN, $I_{pre}$ is the encoded user's historical preference feature extracted, and $W_i$ projects the feature into the sentence representation space.

In some cases, the differences between the two rewards $$R_\theta^1 \text{ and } R_\psi^2$$

may include the following aspects. The rewards $$R_\theta^1$$

determined in the discriminator reward model 250 consider the constraints given by the user during the dialogue more closely in order to generate more accurate next-step recommendations. For example, as shown in FIG. 3, the user adds multiple constraints to the original user query data 205 in multiple rounds during the dialogue flow 300 in the following order: (a) "I am in Los Angeles," (b) "I want the price range below $20 per person," and (c) "I tried it before but don't like it as it is too spicy." All of the constraints may be represented in the constraint function $C_\tau$. The reward $$R_\psi^2$$

determined in the adversarial reward model 260 is used to generate the reasoning summary 270, which contains the details of the final recommendation and the user's preferences. For example, the electronic device 101 can recommend a restaurant to the user by including all details satisfying the user's requirements, such as "Restaurant C is a Thai restaurant located at LA, with an average price $16 per person. The dishes are less spicy compared to other Thai restaurants." Thus, the reward $$R_\psi^2$$

may be used for natural language generation.

Figure 7:
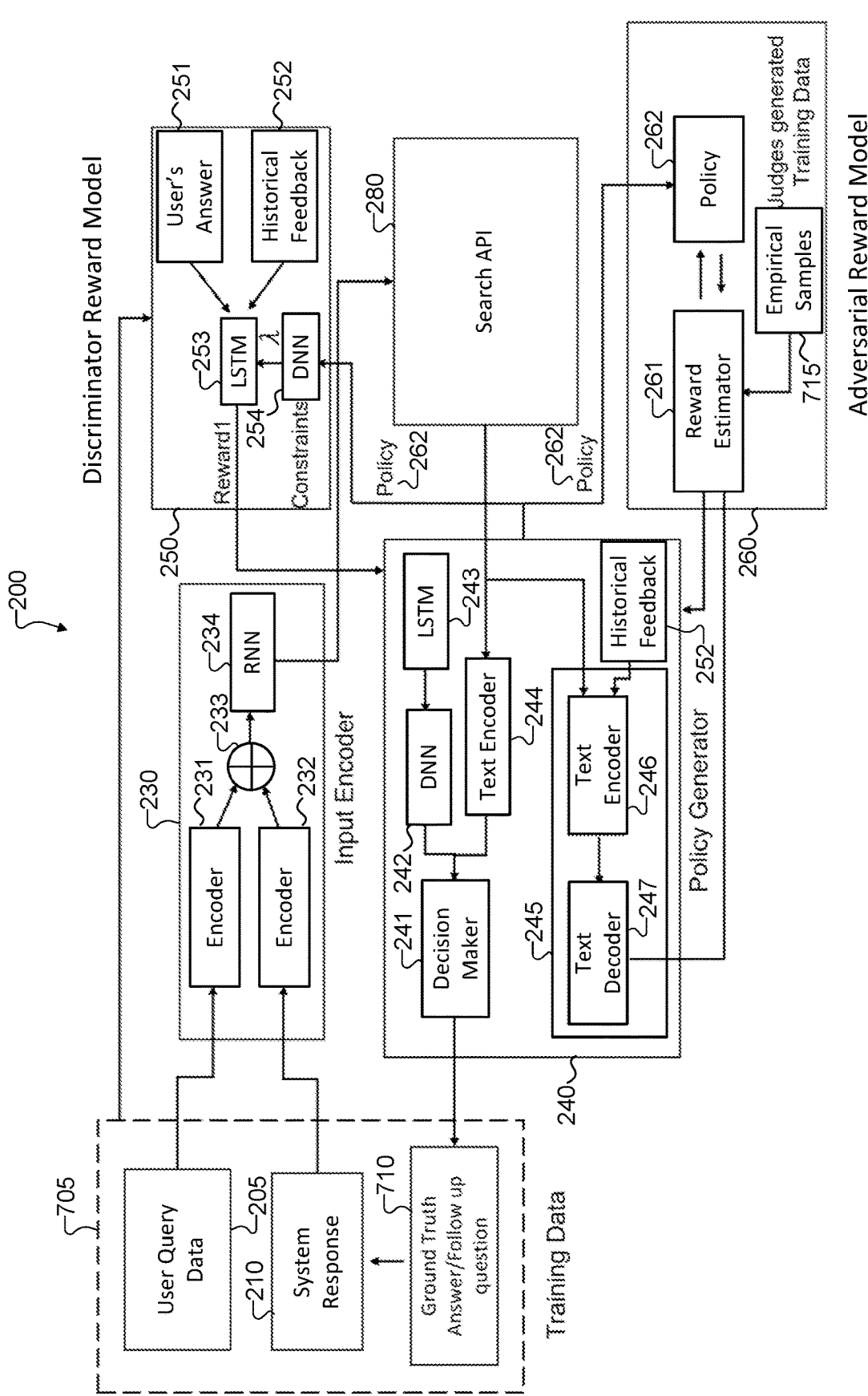
FIG. 7 illustrates an example process for training the dialogue system of FIG. 2 according to this disclosure.

FIG. 7 illustrates an example process for training the dialogue system 200 according to this disclosure. As shown in FIG. 7, training data 705 includes user query data 205, system responses 210, and ground truth data 710 (such as answers and follow-up questions). The training data 705 can be used to periodically train various portions of the dialogue system 200, such as the discriminator reward model 250, the adversarial reward model 260, the policy generator 240, and the decision maker 241. For example, the decision maker 241 can be trained to better match encoded user inputs with encoded application vectors. In some embodiments, training may be performed at regular intervals (such as daily at night).

With respect to learning rules for training the discriminator reward model 250, the discriminator reward model 250 may leverage user preferences as constraints $C_\tau(\pi_\beta)$ when making recommendations, where $\pi_\beta$ is the policy 262 generated by the policy generator 240. The target reward objection of learning may be defined as the sum of the expected rewards $$R_\theta^1$$

with constraints $C_\tau(\pi_\beta)$, which may be expressed as follows:

$$L_\theta(\pi_\beta) = \Sigma_{t=1}^K \mathbb{E}_{\pi_\beta} R_\theta^1(\pi_\beta), \text{ such that } C_\tau(\pi_\beta) < \alpha \tag{5}$$

where $C_\tau(\pi_\beta)$ is a constraint function, IE represents an expectation function, $$R_\theta^1(\pi_\beta)$$

is the reward generated at round t, and $\alpha$ is a constraint parameter between 0 and 1. During text-based interactive recommendation, the user's preferences may be used as constraints. Specifically, the user feedback may be exploited as sequentially-added constraints. To generalize well on the constraints, a discriminator $C_\tau(\pi_\beta)$ may be used as the constraint function, which is also a nonlinear function of the policy 262. Hence, in some embodiments, the objective function can be defined by employing the Lagrange relaxation technique to transform the original reward objection in Equation (5) to an equivalent problem, which may be expressed as follows:

$$J_{dis} = \underset{\lambda \geq 0}{\operatorname{argmin}} \ \underset{\beta}{\operatorname{argmax}} \left[ R_\theta^1 - \lambda(C_\tau(\pi_\beta) - \alpha) \right] \tag{6}$$

where $\lambda \geq 0$ is a Lagrange multiplier. The function in Equation (6) can take the derivative with respect to $\beta$, $\lambda$, $\theta$, and $\tau$ as $\nabla_\beta J_{dis}$, $\nabla_\lambda J_{dis}$, $\nabla_\theta J_{dis}$, and $\nabla_\tau J_{dis}$. The derivative $\nabla_\beta J_{dis}$ may be combined with the derivative of a second objective function (as shown below) with respect to $\beta$ as the update rule for the policy model's parameter $\beta$. The other derivatives $\nabla_\lambda J_{dis}$, $\nabla_\theta J_{dis}$, and $\nabla_\tau J_{dis}$ may be used to update the RNN model 253 for generating the reward and update the DNN layer 254 to estimate the constraints $C_\tau$ as shown in FIG. 5.

With respect to learning rules for training the adversarial reward model 260, to train the nonlinear reward function $$R_\psi^2(N_t) = \phi(.)$$

to estimate the final recommendation, the adversarial reward model 260 can be leveraged to associate the generated final recommendation summary text $N_t$ with the reward function. In some embodiments, the Reward Boltzmann distribution can be used to approximate the distribution of the last round recommendation text, which may be expressed as follows:

$$p_\psi(N_t) = \frac{e^{R_\psi^2(N_t)}}{\sum_{N_i} e^{R_\psi^2(N_i)}} \qquad (7)$$

where $N_i$ denotes one or more empirical samples 715 of training data output at round i. The optimal reward function $R^*(N)$ may be achieved when the Reward Boltzmann distribution $p_\psi(N_t)$ is equal to that in the target recommendation probability distribution $p^*(N)$, where $p^*(N)$ contains the probability distribution of the tokens in the last round recommendation text.

In some embodiments, in order to approximate the Reward Boltzmann distribution towards the "real" data distribution $p^*(N)$, a min-max two-player "game" can be used, where the Reward Boltzmann distribution $p_\psi$ aims at maximizing its similarity with the sampled empirical distribution $p_e$ of the training data while minimizing that with the "faked" data generated from the policy 262 $\pi_\beta$. Conversely, the policy 262 $\pi_\beta$ may try to maximize its similarity with the Reward Boltzmann distribution $p_\psi$. Hence, the objective function $J_{adv}$ of the adversarial reward model 260 may be a min-max function that maximizes the similarity of $p_\psi$ with the sampled empirical distribution $p_e$ and that minimizes the similarity between $p_\psi$ and the recommendation generated by the policy 262 $\pi_\beta$, which can be expressed as follows:

$$J_{adv} = \underset{\beta}{\mathrm{argmax}} \; \underset{\psi}{\mathrm{argmin}} \; KL(p_e \| p_\psi) - KL(\pi_\beta \| p_\psi) \qquad (8)$$

where $KL(\cdot)$ represents the KL divergence. One challenge here may involve how to calculate the derivative of $J_{adv}$, which is also the update rule for the policy generator 240 and the adversarial reward model 260. Here, the derivative of $J_{adv}$ with respect to the policy model network parameter $\beta$ and the reward estimator network parameter $\psi$ may be written as follows:

$$\nabla_\psi J_{adv} = \mathbb{E}_{N \sim p_e(N)}\left(\frac{\delta R_\psi}{\delta \psi}\right) - \mathbb{E}_{N \sim \pi_\beta(N)}\left(\frac{\delta R_\psi}{\delta \psi}\right) \qquad (9)$$

-continued $$\nabla_\beta J_{adv} = \mathbb{E}_{N \sim \pi_\beta(N)}(R_\psi(N) - \log \pi_\beta(N) - b) \times \frac{\log \pi_\beta(N)}{\delta \beta}$$

where b is the estimated baseline to reduce variance during training.

With respect to learning rules for training the policy generator 240, as shown in FIG. 4, the system policy 262 $\pi_\beta$ may contain the information from two different states $$s_t^1 \text{ and } s_t^2,$$

where $$s_t^1$$

is used to recommend during dialogue and $$s_t^2$$

is used for summary generation in the last round. Hence, the learning rule for the policy generator 240 may contain the information from both the discriminator reward model 250 and the adversarial reward model 260, which are also defined by the two rewards correspondingly. Specifically, the learning rule for the policy generator 240 may be defined by the derivative towards the policy parameter $\beta$ of the sum of the two objective functions $J_{dis}$ and $J_{adv}$. It is also equivalent to the sum of the derivative of the two objective functions separately, and this may be expressed as follows:

$$\nabla_\beta(J_{dis} + J_{adv}) = \nabla_\beta(J_{dis}) + \nabla_\beta(J_{adv}) \qquad (10)$$

where $\nabla_\beta(J_{adv})$ is given in Equation (9), and $\nabla_\beta(J_{dis})$ can be easily derived from Equation (6) by taking its derivative towards $\beta$.

Although FIGS. 2 through 7 illustrate one example of a multi-reward interactive dialogue system 200 and related details, various changes may be made to FIGS. 2 through 7. For example, while the dialogue flow 300 of FIG. 3 is shown with six rounds of interaction, any number of rounds may be performed. Also, while certain rounds include system responses 210 as follow-up questions and other rounds include system responses 210 as recommendations, the order and types of the system responses 210 can vary as needed or desired. Further, various operations shown in FIGS. 2 through 7 could overlap, occur in parallel, occur in a different order, or occur any number of times (including zero times). In addition, the operations shown in FIGS. 2 through 7 are examples only, and other techniques could be used to perform each of the operations shown in FIGS. 2 through 7.

Figure 8:
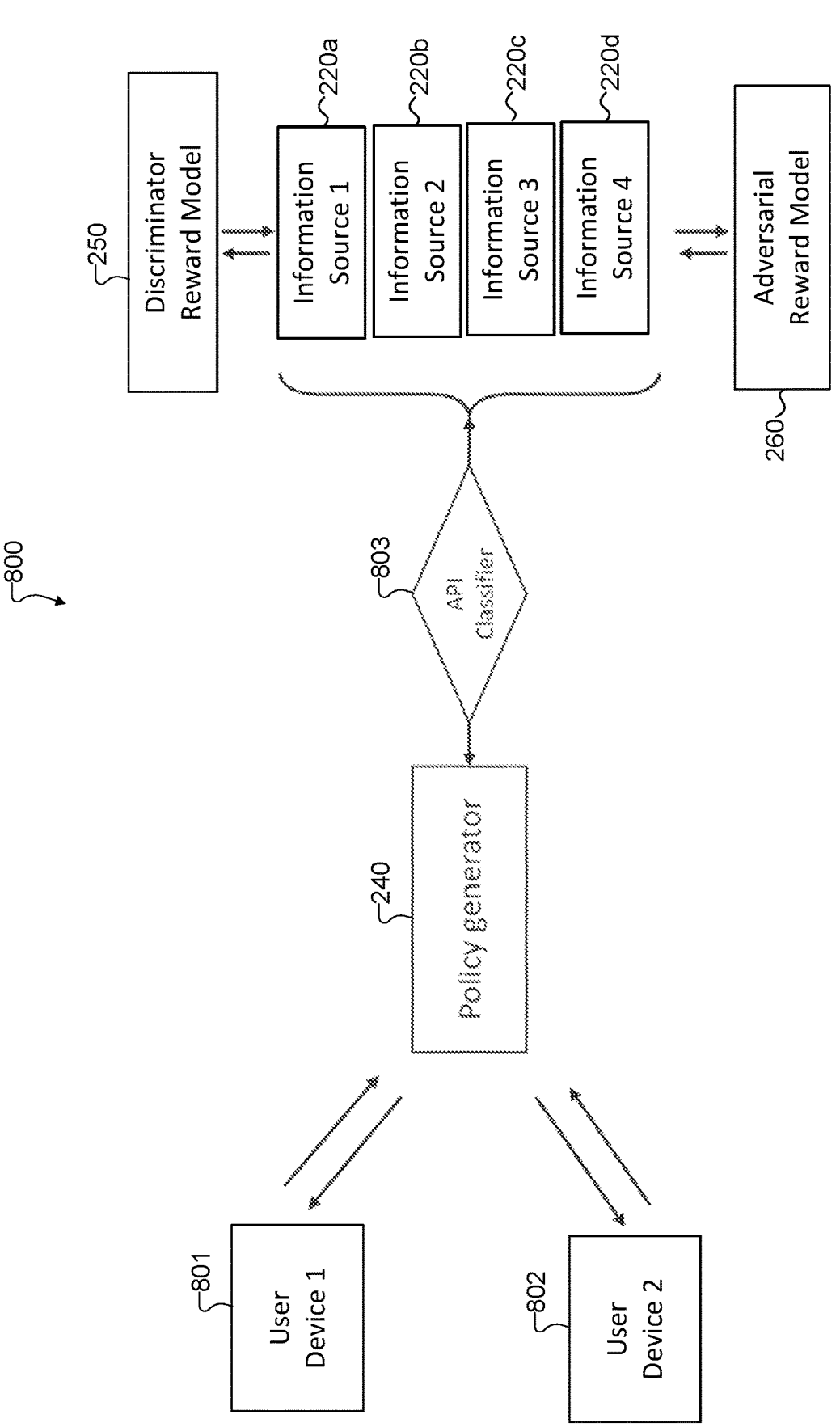
FIG. 8 illustrates another example dialogue system in which multi-reward interactive dialogue using reinforcement learning can be implemented according to this disclosure.

FIG. 8 illustrates another example dialogue system 800 in which multi-reward interactive dialogue using reinforcement learning can be implemented according to this disclosure. For ease of explanation, the system 800 is described as being implemented using multiple devices, such as multiple instances of the electronic device 101 described above.

However, this is merely one example, and the system 800 could be implemented using any other suitable device(s), such as when implemented using one or more servers 106.

As shown in FIG. 8, the system 800 includes multiple components that are the same as or similar to corresponding components in the system 200 of FIG. 2. In contrast to the system 200 (which is described with one electronic device 101 and one information source 220), the system 800 extends the multi-reward interactive dialogue to multiple user devices 801-802 and multiple information sources 220a-220d. Each user device 801-802 may represent an electronic device 101 used by a user. A user can ask questions or provide feedback from each of the user devices 801-802, such as at different times. Each user device 801-802 is synced with the user's personalized policy generator 240 so that the system responses 210 generated using the policy generator 240 are based on the user's chat history on the multiple user devices 801-802.

Each of the multiple information sources 220a-220d represents a different third-party information source that can be queried for generating recommendations for the user. Instead of or in addition to YELP, other possible information sources 220a-220d may include UBER, FACEBOOK, and YOUTUBE (although any other or additional information sources may be used here). During a single dialogue, an API classifier can trigger communication with different ones of the information sources 220a-220d based on the dialogue direction and the user's intention. For example, the user can change topics during the dialogue. In response, the system 800 can recognize the change and trigger the use of different information sources 220a-220d correspondingly.

Although FIG. 8 illustrate one example of a multi-reward interactive dialogue system 800, various changes may be made to FIG. 8. For example, while the system 800 is shown with two user devices 801-802 and four information sources 220a-220d, other numbers of user devices and other numbers of information sources are possible. Also, various operations shown in FIG. 8 could overlap, occur in parallel, occur in a different order, or occur any number of times (including zero times). In addition, the operations shown in FIG. 8 are examples only, and other techniques could be used to perform each of the operations shown in FIG. 8.

Note that the operations and functions shown in FIGS. 2 through 8 can be implemented in an electronic device 101, server 106, or other device in any suitable manner. For example, in some embodiments, the operations and functions shown in FIGS. 2 through 8 can be implemented or supported using one or more software applications or other software instructions that are executed by the processor 120 of the electronic device 101, server 106, or other device. In other embodiments, at least some of the operations and functions shown in FIGS. 2 through 8 can be implemented or supported using dedicated hardware components. In general, the operations and functions shown in FIGS. 2 through 8 can be performed using any suitable hardware or any suitable combination of hardware and software/firmware instructions.

Figure 9:
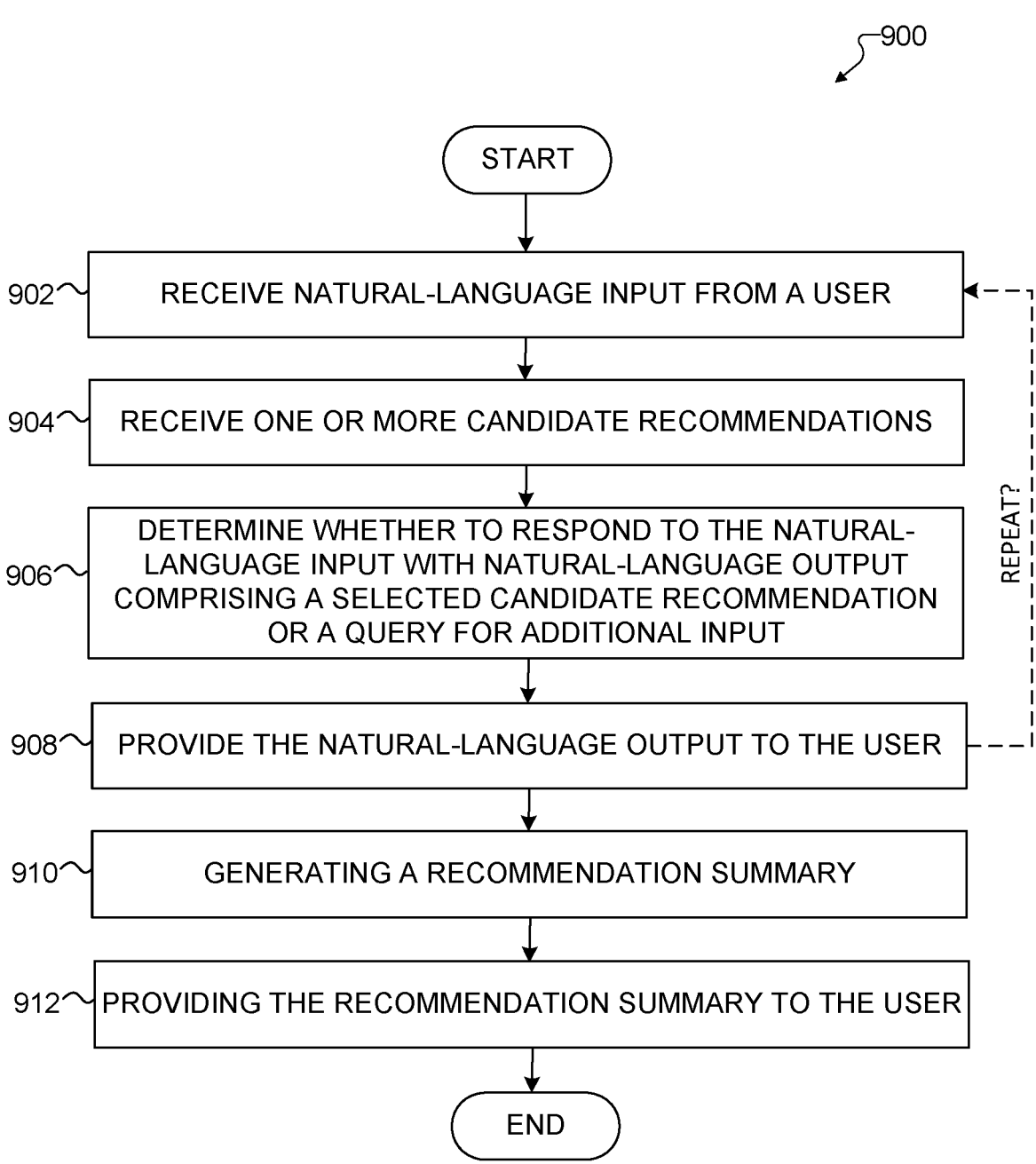
FIG. 9 illustrates an example method for interactive dialogue according to this disclosure.

FIG. 9 illustrates an example method 900 for interactive dialogue according to this disclosure. For ease of explanation, the method 900 shown in FIG. 9 is described as involving the use of the electronic device 101 shown in FIG. 1 and the dialogue system 200 shown in FIG. 2. However, the method 900 shown in FIG. 9 could be used with any other suitable electronic device (such as the server 106) and any suitable system or process.

As shown in FIG. 9, a natural-language input is received from a user at step 902. This could include, for example, the electronic device 101 receiving the user query data 205. One or more candidate recommendations are received from at least one information source as potential responses to the natural-language input at step 904. This could include, for example, the electronic device 101 receiving one or more candidate recommendations from the information source(s) 220.

It is determined whether to respond to the natural-language input with natural-language output that includes (i) the selected candidate recommendation or (ii) a query for additional user input at step 906. The determination can be based on a similarity between the natural-language input and a selected candidate recommendation among the one or more candidate recommendations. This could include, for example, the electronic device 101 using the decision maker 241 to determine whether to generate a system response 210 that includes a selected candidate recommendation or a follow-up question. Based on the determination, the natural-language output is provided to the user at step 908. This could include, for example, the electronic device 101 providing the system response 210 to the user. The steps 902-908 may be repeated during different rounds of the dialogue, such as described with respect to the multiple rounds shown in the dialog flow 300.

After providing the natural-language output that includes the selected candidate recommendation to the user, a reasoning summary is generated at step 910. The reasoning summary can include a natural-language description identifying one or more user preferences and including one or more reasons explaining why the selected candidate recommendation was provided to the user. This could include, for example, the electronic device 101 generating the reasoning summary 310. The reasoning summary is provided to the user at step 912. This could include, for example, the electronic device 101 providing the reasoning summary 310 to the user.

Although FIG. 9 illustrates one example of a method 900 for interactive dialogue, various changes may be made to FIG. 9. For example, while shown as a series of steps, various steps in FIG. 9 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

receiving a natural-language input from a user, wherein the natural-language input from the user is associated with a first preference context;

receiving, from an information source, one or more first candidate recommendations as potential responses to the natural-language input, wherein the one or more first candidate recommendations are determined based on the first preference context;

determining, based on a similarity between the natural-language input and a first selected candidate recommendation among the one or more first candidate recommendations, whether to respond to the natural-language input with a first natural-language output comprising (i) the first selected candidate recommendation or (ii) a pre-recommendation query for an additional user input, the pre-recommendation query for the additional user input comprising a follow-up question requesting additional information related to the natural-language input, wherein the pre-recommendation query occurs prior to outputting the first selected candidate recommendation, and wherein determining whether to respond to the natural-language input with the first natural-language output comprising the pre-recommendation query comprises determining whether a size of a pool of candidate recommendations is greater than a threshold pool size;

responsive to determining to respond to the natural-language input with the first natural-language output comprising the pre-recommendation query for the additional user input, receiving a response to the pre-recommendation query for the additional user input, wherein the response to the pre-recommendation query for the additional user input is associated with a second preference context, wherein the second preference context differs from the first preference context;

receiving, from the information source or another information source, one or more second candidate recommendations, wherein the one or more second candidate recommendations are determined based on the first and second preference contexts;

identifying a second selected candidate recommendation among the one or more second candidate recommendations; and providing the second selected candidate recommendation as a second natural-language output to the user.

2. The method of claim 1, wherein determining whether to respond to the natural-language input with the first natural-language output comprising (i) the first selected candidate recommendation or (ii) the pre-recommendation query for the additional user input comprises:

encoding the natural-language input as an input feature vector representing the natural-language input;

encoding at least one candidate suggestion as a recommendation feature vector;

creating, by a neural network, a similarity vector based on a similarity between the input feature vector and the recommendation feature vector;

comparing values of the similarity vector to a threshold value; and one of:

responsive to at least one of the values of the similarity vector exceeding the threshold value, selecting the first natural-language output to comprise the first selected candidate recommendation; and responsive to no values of the similarity vector exceeding the threshold value, selecting the first natural-language output to comprise the pre-recommendation query for the additional user input.

3. The method of claim 2, wherein the recommendation feature vector and the similarity vector each have multiple dimensions, each of the multiple dimensions corresponding to a category of information about the first selected candidate recommendation.

4. The method of claim 2, wherein:

the input feature vector represents the natural-language input over multiple rounds of a same dialogue; and the natural-language input from one or more recent rounds of the multiple rounds is given a greater weight in determining the similarity between the input feature vector and the recommendation feature vector.

5. The method of claim 1, further comprising:

after providing the first natural-language output comprising the first selected candidate recommendation to the user, generating a reasoning summary comprising a natural-language description identifying one or more user preferences and including one or more reasons explaining why the first selected candidate recommendation was provided to the user; and providing the reasoning summary to the user.

6. The method of claim 5, wherein:

a first reward model is used to determine whether to respond to the natural-language input with the first natural-language output comprising the first selected candidate recommendation or with the first natural-language output comprising the pre-recommendation query for the additional user input; and a second reward model is used to generate the reasoning summary.

7. The method of claim 6, wherein:

the first reward model comprises a discriminatory reward model; and the second reward model comprises an adversarial reward model.

8. An electronic device comprising:

at least one memory configured to store instructions; and at least one processing device configured when executing the instructions to:

receive a natural-language input from a user, wherein the natural-language input from the user is associated with a first preference context;

receive, from an information source, one or more first candidate recommendations as potential responses to the natural-language input, wherein the one or more first candidate recommendations are based on the first preference context;

determine, based on a similarity between the natural-language input and a first selected candidate recommendation among the one or more first candidate recommendations, whether to respond to the natural-language input with a first natural-language output comprising (i) the first selected candidate recommendation or (ii) a pre-recommendation query for an additional user input, the pre-recommendation query for the additional user input comprising a follow-up question requesting additional information related to the natural-language input, wherein the pre-recommendation query occurs prior to outputting the first selected candidate recommendation, and wherein, to determine whether to respond to the natural-language input with the first natural-language output comprising the pre-recommendation query, the at least one processing device is configured to determine whether a size of a pool of candidate recommendations is greater than a threshold pool size;

responsive to determining to respond to the natural-language input with the first natural-language output comprising the pre-recommendation query for the additional user input, receive a response to the pre-recommendation query for the additional user input, wherein the response to the pre-recommendation query for the additional user input is associated with a second preference context, wherein the second preference context differs from the first preference context;

receive, from the information source or another information source, one or more second candidate recommendations, wherein the one or more second candidate recommendations are based on the first and second preference contexts;

identify a second selected candidate recommendation among the one or more second candidate recommendations; and provide the second selected candidate recommendation as a second natural-language output to the user.

9. The electronic device of claim 8, wherein, to determine whether to respond to the natural-language input with the first natural-language output comprising (i) the first selected candidate recommendation or (ii) the pre-recommendation query for the additional user input, the at least one processing device is configured to:

encode the natural-language input as an input feature vector representing the natural-language input;

encode at least one candidate suggestion as a recommendation feature vector;

create, using a neural network, a similarity vector based on a similarity between the input feature vector and the recommendation feature vector;

compare values of the similarity vector to a threshold value; and one of:

responsive to at least one of the values of the similarity vector exceeding the threshold value, select the first natural-language output to comprise the first selected candidate recommendation; and responsive to no values of the similarity vector exceeding the threshold value, select the first natural-language output to comprise the pre-recommendation query for the additional user input.

10. The electronic device of claim 9, wherein the recommendation feature vector and the similarity vector each have multiple dimensions, each of the multiple dimensions corresponding to a category of information about the first selected candidate recommendation.

11. The electronic device of claim 9, wherein:

the input feature vector represents the natural-language input over multiple rounds of a same dialogue; and the at least one processing device is configured to give a greater weight to the natural-language input from one or more recent rounds of the multiple rounds when determining the similarity between the input feature vector and the recommendation feature vector.

12. The electronic device of claim 8, wherein the at least one processing device is further configured to:

after providing the first natural-language output comprising the first selected candidate recommendation to the user, generate a reasoning summary comprising a natural-language description identifying one or more user preferences and including one or more reasons explaining why the first selected candidate recommendation was provided to the user; and provide the reasoning summary to the user.

13. The electronic device of claim 12, wherein the at least one processing device is further configured to:

use a first reward model to determine whether to respond to the natural-language input with the first natural-language output comprising the first selected candidate recommendation or with the first natural-language output comprising the pre-recommendation query for the additional user input; and use a second reward model to generate the reasoning summary.

14. The electronic device of claim 13, wherein:

the first reward model comprises a discriminatory reward model; and the second reward model comprises an adversarial reward model.

15. A non-transitory machine-readable medium containing instructions that when executed cause at least one processor of an electronic device to:

receive a natural-language input from a user, wherein the natural-language input from the user is associated with a first preference context;

receive, from an information source, one or more first candidate recommendations as potential responses to the natural-language input, wherein the one or more first candidate recommendations are based on the first preference context;

determine, based on a similarity between the natural-language input and a first selected candidate recommendation among the one or more first candidate recommendations, whether to respond to the natural-language input with a first natural-language output comprising (i) the first selected candidate recommendation or (ii) a pre-recommendation query for an additional user input, the pre-recommendation query for the additional user input comprising a follow-up question requesting additional information related to the natural-language input, wherein the pre-recommendation query occurs prior to outputting the first selected candidate recommendation, and wherein the instructions that when executed cause the at least one processor to determine whether to respond to the natural-language input with the first natural-language output comprising the pre-recommendation query include instructions that when executed cause the at least one processor to determine whether a size of a pool of candidate recommendations is greater than a threshold pool size;

responsive to determining to respond to the natural-language input with the first natural-language output comprising the pre-recommendation query for the additional user input, receive a response to the pre-recommendation query for the additional user input, wherein the response to the pre-recommendation query for the additional user input is associated with a second preference context, wherein the second preference context differs from the first preference context;

receive, from the information source or another information source, one or more second candidate recommendations, wherein the one or more second candidate recommendations are based on the first and second preference contexts;

identify a second selected candidate recommendation among the one or more second candidate recommendations; and provide the second selected candidate recommendation as a second natural-language output to the user.

16. The non-transitory machine-readable medium of claim 15, wherein the instructions that when executed cause the at least one processor to determine whether to respond to the natural-language input with the first natural-language output comprising (i) the first selected candidate recommendation or (ii) the pre-recommendation query for the additional user input comprise instructions that when executed cause the at least one processor to:

encode the natural-language input as an input feature vector representing the natural-language input;

encode at least one candidate suggestion as a recommendation feature vector;

create, using a neural network, a similarity vector based on a similarity between the input feature vector and the recommendation feature vector;

compare values of the similarity vector to a threshold value; and one of:

responsive to at least one of the values of the similarity vector exceeding the threshold value, select the first natural-language output to comprise the first selected candidate recommendation; and responsive to no values of the similarity vector exceeding the threshold value, select the first natural-language output to comprise the pre-recommendation query for the additional user input.

17. The non-transitory machine-readable medium of claim 16, wherein the recommendation feature vector and the similarity vector each have multiple dimensions, each of the multiple dimensions corresponding to a category of information about the first selected candidate recommendation.

18. The non-transitory machine-readable medium of claim 16, wherein:

the input feature vector represents the natural-language input over multiple rounds of a same dialogue; and the instructions when executed cause the at least one processor to give a greater weight to the natural-language input from one or more recent rounds of the multiple rounds when determining the similarity between the input feature vector and the recommendation feature vector.

19. The non-transitory machine-readable medium of claim 15, further containing instructions that when executed cause the at least one processor to:

after providing the first natural-language output comprising the first selected candidate recommendation to the user, generate a reasoning summary comprising a natural-language description identifying one or more user preferences and including one or more reasons explaining why the first selected candidate recommendation was provided to the user; and provide the reasoning summary to the user.

20. The non-transitory machine-readable medium of claim 19, further containing instructions that when executed cause the at least one processor to:

use a first reward model to determine whether to respond to the natural-language input with the first natural-language output comprising the first selected candidate recommendation or with the first natural-language output comprising the pre-recommendation query for the additional user input; and use a second reward model to generate the reasoning summary.

21. The method of claim 1, further comprising:

in response to determining that the size of the pool of candidate recommendations is greater than the threshold pool size, generating the pre-recommendation query;

wherein the pre-recommendation query comprises a follow-up question to reduce the size of the pool of candidate recommendations.

\* \* \* \* \*